United States Patent [19]

Joshi et al.

[11] 4,343,714

[45] Aug. 10, 1982

[54] PROCESS FOR TREATING CATHODE MATERIAL

[75] Inventors: Ashok V. Joshi, Bombay, India; Nehemiaha Margalit, Chester, N.Y.

[73] Assignee: Ray-O-Vac Corporation, Madison, Wis.

[21] Appl. No.: 212,699

[22] Filed: Dec. 3, 1980

[51] Int. Cl.³ .................. H01M 4/08; H01M 4/58
[52] U.S. Cl. ..................... 252/182.1; 429/218; 252/506; 252/510; 252/518
[58] Field of Search ............ 252/182.1, 506, 510, 252/518; 429/218

[56] References Cited

U.S. PATENT DOCUMENTS

| | | | |
|---|---|---|---|
| 4,130,500 | 12/1978 | Melendres et al. | 252/182.1 |
| 4,143,217 | 3/1979 | Joo' et al. | 252/182.1 |
| 4,144,383 | 3/1979 | Joo' et al. | 252/182.1 |
| 4,158,720 | 6/1979 | Kaun | 252/182.1 |
| 4,164,069 | 8/1979 | Tomczuk | 252/182.1 |
| 4,169,808 | 10/1979 | Klemann et al. | 252/182.1 |

*Primary Examiner*—Irwin Gluck
*Attorney, Agent, or Firm*—Raymond J. Kenny; Francis J. Mulligan, Jr.

[57] ABSTRACT

A process for treating non-stoichiometric cathode material such as iron sulfide, manganese dioxide, titanium disulfide and the like comprising treating a cathode pellet of said cathode material with a solution of an active compound of an active metal (e.g. butyl lithium) to reduce impurities in the material and surface quantities of the cathode material.

10 Claims, No Drawings

PROCESS FOR TREATING CATHODE MATERIAL

The process of the present invention is concerned with solid, non-stoichiometric cathode materials and, more particularly, with solid, non-stoichiometric cathode materials to facilitate their use in electrochemical cells having active metals as anodes.

HISTORY OF THE ART AND PROBLEM

It is known that certain cathode materials useful in electrochemical cells are non-stoichiometric in nature. Thus, substances which can be designated as FeS, $MnO_2$, $TiS_2$, $(CF_x)_n$, $Cr_2O_3$ and the like are not exactly of the composition indicated by the chemical formula. Although these substances, both conventionally and in this specification, are indicated by these formulas, they actually contain impurities and amounts of the non-metal, i.e., oxygen, sulfur and the like, which are in excess of the stoichiometric quantity indicated by the formulas. Because of these impurities and excesses, electrochemical cells having cathodes made of these non-stoichiometric compounds exhibit anomolously high open circuit voltages and high initial discharge plateaus.

In voltage sensitive solid-state devices, it is highly undesirable to employ an electrochemical cell which exhibits such a high initial open circuit voltage. The art has avoided this problem by including as a manufacturing operation, an initial discharge of perhaps 5% to 10% of the cell capacity at a low drain rate to bring the cell to a stable voltage. Such a discharge operation is time consuming and expensive and thus undesirable.

DISCOVERY AND OBJECTS

It has now been discovered that by means of a chemical reduction step, the open circuit voltage of an electrochemical cell having an active metal anode and, as initially constituted, a non-stoichiometric cathode can be stabilized at or near the equilibrium open circuit voltage (OCV) of the cell.

It is an object of the present invention to provide a novel process for treating cathodes made of non-stoichiometric materials.

Other objects and advantages will become apparent from the following description.

GENERAL DESCRIPTION

The present invention contemplates treating a solid-state non-stoichiometric cathode material of the type, $M_aY_b$ where M is selected from the group of metals and carbon, Y is selected from the group of non-metals, a is the number of atoms of M and b is the number of atoms of Y, with a solution containing a compound of metal active with respect to Y, and thereafter removing the solution from the cathode material, the metal in solution being in a state wherein it is capable of forming a compound with Y derived from the material $M_aY_b$.

Advantageously, the active metal is that metal which is employed as the anode in the cell in which the cathode material is to be used. As those skilled in the art are aware, active metals from the group of alkali metals and alkaline earth metals and particularly, lithium are used as anodes in solid-state electrochemical cells. For purposes of this specification and claims the present invention will be particularly described with reference to cathodes employed in cells having a lithium anode in view of the fact that lithium is highly advantageous in terms of energy density.

When employing the process of the invention, it is particularly advantageous to employ, in solution, compounds of the active metal wherein the active metal e.g. lithium is capable of reducing action. Such compounds include metal alkyls and aryls such as butyl lithium, ethyl lithium or phenyl lithium and solvated ammoniacal compounds formed when the metal, particularly an alkali metal, is dissolved in liquid ammonia. In the case of lithium alkyls, reaction with non-stoichiometric $M_aY_b$ type compounds results in the formation of stoichiometric $M_aY_b$, a lithium -Y compound, a hydrocarbon produced by the combination of two alkyl radicals and some surface reduction of $M_aY_b$ to metal. The use of metal alkyls and particularly lithium alkyls is highly advantageous in that so long as the alkyl group is not too large, i.e., containing less than about 6 carbon atoms, the alkane or other hydrocarbon resulting from reaction is readily removed from the treated cathode material by volatilization under mild conditions.

The solvent for the active metal compound must have certain characteristics to provide solutions useful in the practice of the present invention. Firstly, the solvent must carry in solution in the liquid state a reasonable amount of active metal compound. For example, it is advantageous that the solution contain at least about 0.01 mole of active metal compound per liter of solution at room temperature although less concentrated solutions can also be used. Secondly, the solvent should not adversely react with the active metal compound to prevent reaction with cathode material. Thirdly, the solvent should not react with the cathode material either in its non-stoichiometric or its stoichiometric state. Finally, the solvent should be removable from the cathode material, preferably under mild conditions. When using metal alkyls or aryls, it is recommended that normally liquid hydrocarbons such as n-hexane, 2 methyl pentane, n-heptane, 3-ethyl pentane and the like or commercially available, dry, solvent mixtures having roughly equivalent boiling ranges and vapor pressure ranges be used as solvents. In the case of solvated ammoniacal metal compounds, ordinarily, excess liquid ammonia will function as the solvent.

DETAILED DESCRIPTION OF THE INVENTION

In carrying the present invention into practice, it is, as indicated hereinbefore, advantageous to employ as the active metal of the compound in solution that active metal which is employed as the anode of the electrochemical cell in which the cathode is to be used. The product compound of the active metal, eg. lithium, with the Y component of the $M_aY_b$ compound normally remains in place in the cathode mass unless steps are taken to remove it. This product compound, eg. $Li_2S$, $Li_2O$ can be an electrolytic conductor and/or can form part of the electrolyte (either solid state or in solution) of the completed cell. The commonality of the metal of the anode, the metal of the treating compound and thus the metal of the product compound minimizes complications in cell operation.

It is also advantageous to carry out the process of the present invention on a shaped cathode mass of non-stoichiometric cathode material. As presently contemplated, such a shaped mass would be in the form of a compressed pellet of cathode material, usually in the form of a squat, right cylinder of a diameter suitable for use in a button cell. The advantage of treating such a shape is that while the pellet is porous to some extent allowing penetration of treating solution and internal treatment, the bulk of the reduction of stoichiometric cathode material will be confined to the pellet exterior which is accessible to excess solution. Thus a cathode pellet treated in accordance with the present invention will have a metal-rich skin which facilitates current pickup by the cathode contact means. In the ordinary case as presently envisioned, the cathode contact means will be one part of the can structure of a conventional button cell container. Treatment times and temperatures can be varied widely dependent upon the results desired and the treatment (reducing) solution which is used. When employing one molar solutions of lithium alkyls, it has been found that treatment times of about 1 to 5 minutes at room temperature for pelleted iron sulfide cathodes are satisfactory.

In order to give those skilled in the art a better understanding and appreciation of the invention, the following examples are given:

EXAMPLES

Ten button cells, each weighing about 1.4 grams, having a lithium anode, a separator system and an electrolyte comprising a one molar solution of $LiAsF_6$ in an equal weight mixture of propylene carbonate and dimethoxyethane were made with an iron sulfide cathode pellet weighing about 0.5 gram. The pellet was in the form of a squat right cylinder about 1.7 mm thick. Prior to cell assembly each of the cathode pellets was treated with a 1.0 M solution of butyl lithium in hexane at room temperature, followed by solution removal and volatilization of remaining solvent. The following Table sets forth times of treatment of the cathode with solution and open circuit voltage (OCV) voltage characteristics of the cells.

TABLE

| Cell No. | Treatment Time (mins) | OCV at (0.5 hr) | OCV at (2.0 hr) |
| --- | --- | --- | --- |
| 1 | 3 | 1.718 | 1.752 |
| 2 | 3 | 1.726 | 1.725 |
| 3 | 3 | 1.722 | 1.722 |
| 4 | 3 | 1.732 | 1.731 |
| 5 | 3 | 1.717 | 1.717 |
| 6 | 1.5 | 1.754 | 1.721 |
| 7 | 1.5 | 1.746 | 1.723 |
| 8 | 1.5 | 1.759 | 1.722 |
| 9 | 1.5 | 1.761 | 1.731 |
| 10 | 1.5 | 1.755 | 1.717 |

Untreated cathode pellets of iron sulfide employed as cathodes in equivalent cells are expected to exhibit initial OCV's of about 2.7 volts which decay in use or preuse discharge to about 1.7 volts.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for treating non-stoichiometric, solid cathode materials adapted to be used in electrochemical cells containing an active metal anode, said treatment effecting said non-stoichiometric, solid cathode materials in a manner to cause them, in said cell, to exhibit their substantially equilibrium open-circuit potential while minimally sacrificing energy density, said process comprising exposing said cathode materials to a solution of a compound of an active metal to reduce active impurities in said cathode material and a small amount of said cathode material on the solid surface and thereafter removing said solution, the active metal in said compound being in a state wherein it is capable of forming a compound with Y derived from the material $M_aY_b$.

2. A process as in claim 1 wherein said compound of said active metal is selected from the group of metal alkyls and metal aryls.

3. A process as in claim 1 wherein said active metal of said compound is the same metal employed as an anode in said electrochemical cell.

4. A process as in claim 1 in which said active metal in said compound is an alkali metal.

5. A process as in claim 2 in which said active metal in said compound is an alkali metal.

6. A process as in claim 1 wherein said active metal in said compound is lithium.

7. A process as in claim 2 wherein said active metal in said compound is lithium.

8. A process as in claim 1 wherein said compound of said active metal is a lithium alkyl.

9. A process as in claim 1 wherein said alkyl moiety contains less than about 6 carbon atoms.

10. A process as in claim 8 wherein said compound is butyl lithium.

* * * * *